(12) United States Patent
Takahashi et al.

(10) Patent No.: US 11,036,013 B2
(45) Date of Patent: Jun. 15, 2021

(54) OPTICAL SENSOR AND ANALYZER USING THE SAME

(71) Applicant: Hitachi, Ltd., Tokyo (JP)

(72) Inventors: Makoto Takahashi, Tokyo (JP); Yoshiyuki Takamori, Tokyo (JP)

(73) Assignee: HITACHI, LTD., Tokyo (JP)

( * ) Notice: Subject to any disclaimer, the term of this patent is extended or adjusted under 35 U.S.C. 154(b) by 115 days.

(21) Appl. No.: 16/258,763

(22) Filed: Jan. 28, 2019

(65) Prior Publication Data
US 2019/0293516 A1 Sep. 26, 2019

(30) Foreign Application Priority Data
Mar. 22, 2018 (JP) .............................. JP2018-054842

(51) Int. Cl.
*G01M 3/04* (2006.01)
*G02B 6/42* (2006.01)
(Continued)

(52) U.S. Cl.
CPC ............... *G02B 6/42* (2013.01); *G01N 21/17* (2013.01); *G01N 21/431* (2013.01); *G01N 23/02* (2013.01);
(Continued)

(58) Field of Classification Search
CPC . G01M 3/047; G01N 21/431; G01N 21/7703; G01N 2021/433;
(Continued)

(56) References Cited

U.S. PATENT DOCUMENTS 5,005,005 A * 4/1991 Brossia ................. B64D 15/20
250/573
5,657,338 A * 8/1997 Kitamura ............. G02B 6/1228
372/46.01
(Continued)

FOREIGN PATENT DOCUMENTS

JP 05322747 A * 12/1993
JP 2000-097850 A 4/2000
(Continued)

OTHER PUBLICATIONS

Roman Kostecki, Heike Ebendorff-Heidepriem, Claire Davis, Grant McAdam, Stephen C. Warren-Smith, and Tanya M. Monro; Silica exposed-core microstructured optical fibers, vol. 2, No. 11 / Optical Materials Express, 1538-1547 (Year: 2012).*
(Continued)

*Primary Examiner* — Peter J Macchiarolo
*Assistant Examiner* — Fatemeh Esfandiari Nia
(74) *Attorney, Agent, or Firm* — Mattingly & Malur, PC

(57) ABSTRACT

Provided are an optical sensor and an analyzer, including an optical sensor section in which a cladding layer of an optical fiber is removed so as to expose a core layer by a predetermined optical path length, and a protective material is added to a surface of the exposed core layer, the protective material having higher resistance to an organic solvent, base, or acid than that of the cladding layer; a light source device that causes light to enter one end of the optical fiber; a light receiving device that receives transmitted light emitted from another end of the optical fiber; and a control device that controls the light source device and the light receiving device to measure optical transmittance in the optical sensor based on a ratio of intensity of the light emitted from the light source device to intensity of the light received by the light receiving device.

7 Claims, 10 Drawing Sheets

(51) Int. Cl.
*G01N 21/43* (2006.01)
*G02B 6/14* (2006.01)
*G01N 23/02* (2006.01)
*G02B 6/12* (2006.01)
*G01N 21/17* (2006.01)
*C08L 33/12* (2006.01)

(52) U.S. Cl.
CPC ............... *G02B 6/12* (2013.01); *G02B 6/14* (2013.01); *C08L 33/12* (2013.01); *G01M 3/047* (2013.01); *G01N 2021/433* (2013.01)

(58) Field of Classification Search
CPC ........... G01N 2021/7736; G01N 21/17; G01N 21/532; G01N 21/534; G01N 21/59; G01N 2006/12121; G01N 2006/12123; G02B 6/42; G02B 6/4206; G02B 6/12; G02B 6/12002; G02B 6/12004; G02B 6/1228; G02B 6/14; G02B 6/4204
See application file for complete search history.

(56) References Cited

U.S. PATENT DOCUMENTS

| | | | | |
|---|---|---|---|---|
| 5,995,686 | A * | 11/1999 | Hamburger | G02B 6/02 385/12 |
| 6,345,138 | B1 * | 2/2002 | Kawai | G02B 6/26 385/43 |
| 8,909,004 | B2 * | 12/2014 | Egalon | G01N 21/648 385/12 |
| 2004/0125846 | A1 * | 7/2004 | Zediker | G02B 6/122 372/50.22 |
| 2007/0195847 | A1 * | 8/2007 | Fukamachi | H01S 5/22 372/46.01 |
| 2008/0137695 | A1 * | 6/2008 | Takahashi | G02B 6/1228 372/19 |
| 2009/0034901 | A1 * | 2/2009 | Takabayashi | G01F 23/292 385/12 |
| 2011/0268385 | A1 * | 11/2011 | Yamashita | G02B 6/125 385/12 |
| 2012/0288227 | A1 * | 11/2012 | Kim | G02B 6/0229 385/12 |
| 2015/0285737 | A1 * | 10/2015 | Gliere | G01N 21/03 356/437 |
| 2015/0300943 | A1 * | 10/2015 | Jardinier | G01N 21/31 356/440 |
| 2017/0261485 | A1 * | 9/2017 | Panella | G01N 33/2841 |
| 2018/0095041 | A1 * | 4/2018 | van Mechelen | G01N 21/7703 |
| 2018/0259709 | A1 * | 9/2018 | Yoshioka | G06F 3/042 |
| 2020/0033314 | A1 * | 1/2020 | Schwabacher | C09B 29/3673 |

FOREIGN PATENT DOCUMENTS

| | | | |
|---|---|---|---|
| JP | 2001099780 A | * | 4/2001 |
| JP | 2008076195 A | * | 4/2008 |
| JP | 2015102455 A | * | 6/2015 |

OTHER PUBLICATIONS

Liu et al, Packaging of High Power Semiconductor Lasers (Micro- and Opto-Electronic Materials, Structures, and Systems) 2015th Edition, "Liu" (Year: 2015).*
User Manual Spectrumeters—StellarNet Inc (Year: 2018).*
Roman Kostecki, Heike Ebendorff-Heidepriem, Claire Davis,Grant McAdam,Stephen C.Warren-Smith, and Tanya M. Monro; Silica exposed-core microstructured optical fibers,vol. 2, No. 11 / Optical Materials Express, 1538-1547 (Year: 2012) (Year: 2012).*
JP-2008076195-A—English translation (Year: 2008).*
JP-2015102455-A—English translation (Year: 2015).*
JP-2001099780-A—English translation (Year: 2001).*

* cited by examiner

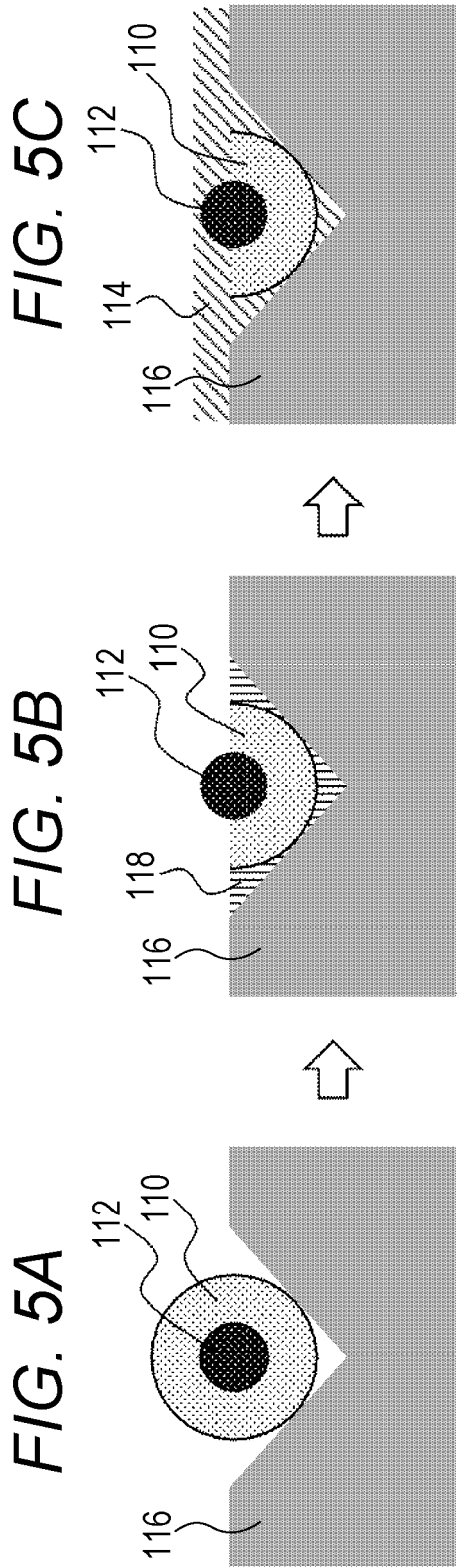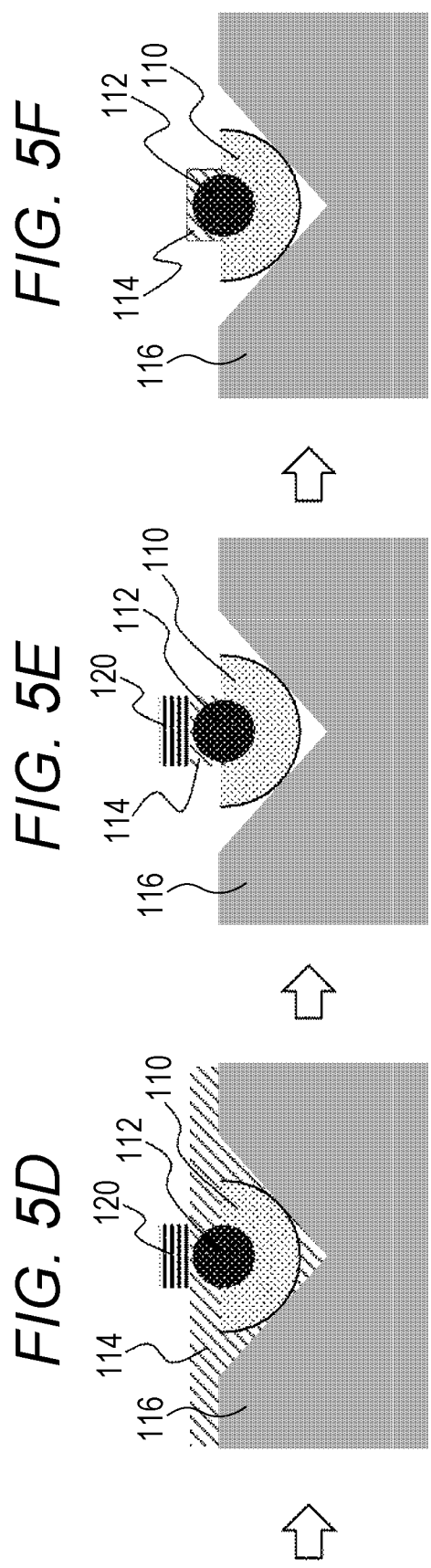

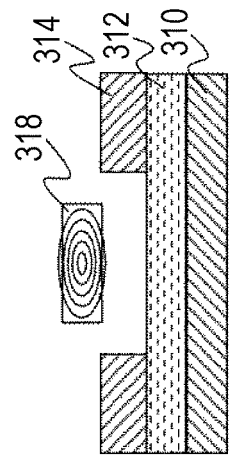
FIG. 15A
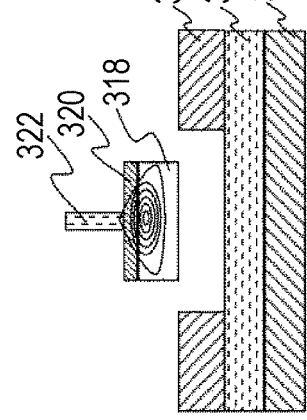
FIG. 15B
FIG. 15C
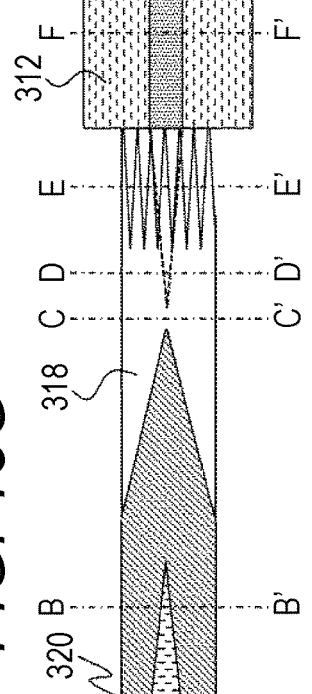
FIG. 15G
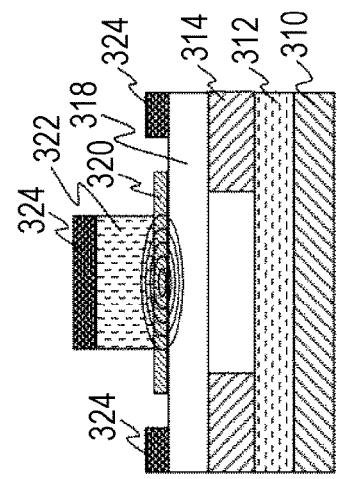
FIG. 15D
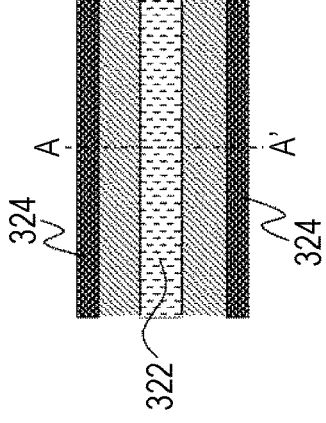
FIG. 15E
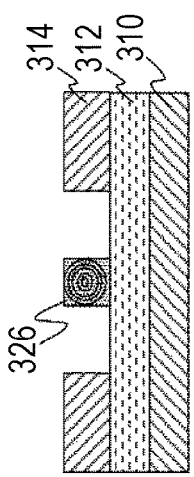
FIG. 15F
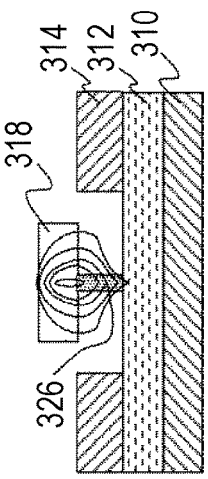

OPTICAL SENSOR AND ANALYZER USING THE SAME

BACKGROUND OF THE INVENTION

1. Field of the Invention

The present invention relates to an optical sensor and an analyzer using the same.

2. Description of the Related Art

In the case where a machined part subjected to cutting work or the like is welded in a welding process as a next process, if cutting oil has adhered to the part in the preceding process, welding quality will be impaired by the oil having adhered thereto. Therefore, a cleaning process for machined parts is generally provided so as to remove oil therefrom.

However, a cleaning liquid is polluted with oil in long use. It is thus necessary to monitor pollution of a cleaning liquid and to clean the cleaning liquid by distillation when the cleaning liquid is polluted. Frequent distillation will eliminate the problem, but will reduce operation efficiency. Therefore, in order to continuously monitor the amount of oil in a cleaning liquid so that the cleaning liquid can be distilled when the amount of oil reaches a predetermined amount, there is a demand for an optical sensor and an analyzer capable of measuring the concentration of oil in a cleaning liquid for machine parts without drawing a sample from an apparatus.

It is possible to deal with measurement of the amount of oil in a cleaning liquid of a wide range of cleaning methods by adopting, for example, the optical absorption method as a method of measuring the amount of oil in a cleaning liquid. The optical absorption method is applicable regardless of whether cutting oil is mineral oil or non-mineral oil, and enables measurement regardless of whether an additive has been included in the cleaning liquid.

The optical absorption method is a method for quantitatively analyzing the concentration of an objective substance by applying light to a sample solution and measuring a degree of light absorption by the substance, that is, absorbance at the time when the light passes through the sample.

The bulk light type is a conventional technique of a sensor as an application of the optical absorption method. When light is transmitted through a cleaning liquid 123 by use of a lens, a prism 124, or the like as shown in FIG. 2A, light of a specific wavelength is absorbed by oil. Thus, the intensity of transmitted light changes according to the amount of oil. The bulk light type is a system for measuring the intensity by a spectroscope. The bulk light type involves a large-scale measuring instrument. Providing two paths as reference paths (it is necessary to compare light intensity in the presence of oil and that in the absence of oil) complicates an optical system, resulting in vulnerability to vibration. In addition, coating or the like is necessary for maintaining chemical resistance of the surface of the lens or prism. However, according to the principle of light reaching the spectroscope at a rate of 100% in the absence of oil, there are few places to cause loss in light. This leads to an advantage of high sensitivity accordingly.

JP 2000-097850 A discloses a liquid sensor device of a system different from the bulk light type implementing the optical absorption method. The liquid sensor device disclosed in JP 2000-097850 A includes an optical waveguide such as an optical fiber disposed around an object to be inspected so as to detect leakage of liquid such as stored liquid and transported liquid. A material having a refractive index lower than that of a core material is used as a clad material covering the outer periphery of the core of the optical fiber. The clad material is a special material having the property of absorbing liquid or the property of being damaged by liquid when the liquid adheres to the material (there is no specific mention of the kind of clad material).

When leaking liquid comes into contact with cladding, the cladding absorbs the leaking liquid or is damaged by the leaking liquid. As a result, the leaking liquid reaches the outer periphery of the core. Light incident on the optical fiber leaks from a portion exposed to the leaking liquid, and a larger amount of light of a wavelength that is easily absorbed by the liquid to be inspected (leaking liquid) is absorbed. It is described that a light receiving device connected to an output end of the optical fiber analyzes a pattern of a spectrum absorbed by the leaking liquid to determine the presence or absence of leakage of liquid and the type of leaking liquid.

SUMMARY OF THE INVENTION

An object of the liquid sensor device disclosed in JP 2000-097850 A is to detect liquid leakage of an object to be inspected. Under normal conditions with no liquid leakage having occurred, the core of the optical fiber is not in contact with liquid. However, once liquid leakage occurs, the core of the optical fiber comes into contact with liquid, and leakage and absorption of light occurs accordingly. An object of the above-described liquid sensor device is to detect the leakage and absorption of light, and to raise an alarm. That is, the above-described liquid sensor device is not intended to continuously perform inspection while immersing a sensing area of the optical fiber in liquid to be inspected.

A liquid sensor device, to which the present invention is to be applied, is intended for use in constant measurement of the concentration of oil in a cleaning liquid for machine parts over a long period of time (real-time monitoring). Particularly, since a cleaning liquid for machine parts is an organic solvent or an acidic or basic solution, the cleaning liquid has the property of corroding the core. Therefore, it is conceivable that the core of the sensing area of the optical fiber is corroded while being exposed to the cleaning liquid for a long period of time, resulting in a deterioration in a sensor property. Furthermore, in cleaning machine parts, it is necessary to detect a low concentration of oil in a cleaning liquid. However, it has been difficult for the liquid sensor device disclosed in JP 2000-097850 A to detect such a low concentration of oil since the device has a short sensing area.

Accordingly, an object of the present invention is to provide an optical sensor and an analyzer that can be used in a cleaning liquid for a long period of time, and can measure the concentration of oil existing at a low concentration.

In a preferable example of an analyzer of the present invention, there are included an optical sensor section in which a cladding layer of an optical fiber is removed so as to expose a core layer by a predetermined optical path length, and a protective material is added to a surface of the exposed core layer, the protective material having higher resistance to an organic solvent, base, or acid than that of the cladding layer; a light source device that causes light to enter one end of the optical fiber of the optical sensor; a light receiving device that receives transmitted light emitted from another end of the optical fiber of the optical sensor; and a control device that controls the light source device and the light receiving device to measure optical transmittance in the optical sensor based on a ratio of intensity of the light emitted from the light source device to intensity of the light received by the light receiving device.

Furthermore, in a preferable example of an optical sensor and an analyzer of the present invention, there are included an optical waveguide in which an insulating layer and a core layer formed on a substrate are patterned by etching to form the core layer in a spiral shape; a light emitting element that causes light to enter one end of the optical waveguide; and a light receiving element that receives transmitted light emitted from another end of the optical waveguide, wherein a cladding layer on a side opposite to the substrate with respect to the core layer is removed or thinned, and optical transmittance in the optical waveguide is measured based on a ratio of intensity of the light emitted from the light emitting element to intensity of the light received by the light receiving element According to the present invention, it is possible to provide an optical sensor and an analyzer that can be used in a cleaning liquid for a long period of time, and can measure the concentration of oil existing at a low concentration.

BRIEF DESCRIPTION OF THE DRAWINGS

FIGS. 5A to 5F are diagrams describing respective steps of a method of manufacturing the optical sensor in the first embodiment of the present invention;

FIGS. 15A to 15G are diagrams showing a configuration example in which a semiconductor laser is integrated into an optical waveguide on an SOI substrate without use of an adhesive.

DESCRIPTION OF THE PREFERRED EMBODIMENTS

Embodiments of the present invention will be described below with reference to the drawings.

First Embodiment

Figure 1:
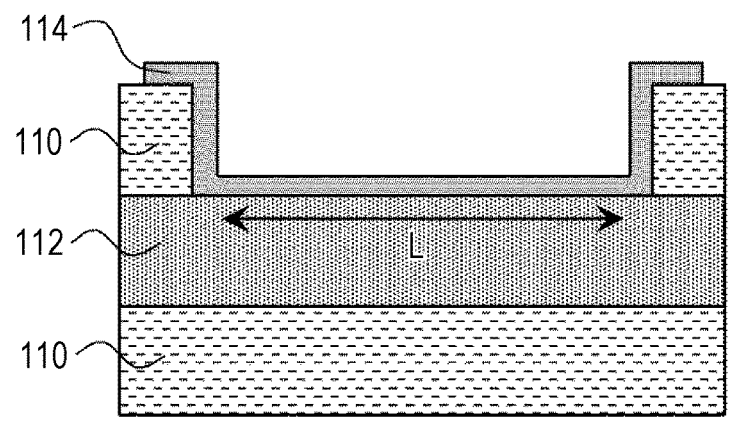
FIG. 1 is a cross-sectional view of an optical sensor according to a first embodiment of the present invention.

FIG. 1 shows a first embodiment of the present invention. FIG. 1 is a cross-sectional view of an optical sensor section for use in an analyzer that is provided by the present invention. In the present embodiment, a cladding layer 110 is removed from a part of an optical fiber to expose a core layer 112. Then, a protective material 114 is added onto the core layer 112. Here, the protective material 114 is a material having higher resistance to an organic solvent, base, or acid than that of the cladding layer. Examples of such materials include SiN and polymethylmethacrylate (PMMA). This enables the present optical sensor to be used for long-term real-time monitoring of the concentration of oil in a cleaning liquid that is an organic solvent or a basic or acidic solution.

In order to measure the concentration of oil in a cleaning liquid with the optical sensor having the present configuration, light just needs to be caused to enter one end of the optical fiber while the part, from which the cladding layer has been removed, is placed in the cleaning liquid in a cleaning machine.

Figure 2A:
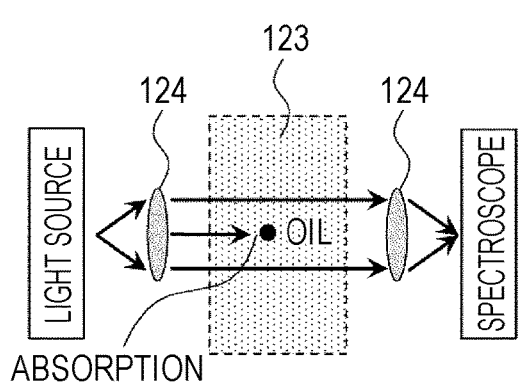
FIGS. 2A and 2B are diagrams describing measurement principles of the bulk light type and the evanescent light type, respectively, in which the optical absorption method has been adopted.
Figure 2B:
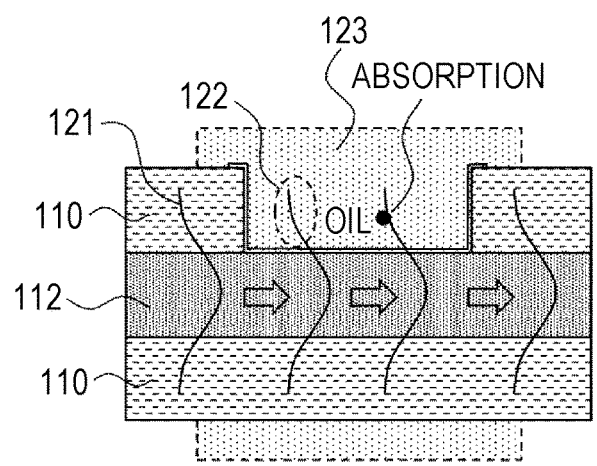

A measurement principle will be described with reference to FIG. 2B. FIG. 2B shows a sectional view of the optical fiber having a layer structure with the core layer 112 sandwiched between the cladding layers 110. When the incident light propagates, a part of the light leaks from the core 112. When a reference sign 121 denotes the intensity distribution of the propagating light, the light that leaks from the core 112 is referred to as evanescent light 122. The evanescent light 122 is based on a phenomenon in which light seeps from a high refractive index medium to a low refractive index medium through an interface under the total reflection condition.

In the case where the part of the optical fiber from which the cladding layer 110 has been removed is immersed in a cleaning liquid 123 as shown in FIG. 2B, the evanescent light 122 of the propagating light comes into contact with oil in the cleaning liquid 123, and the oil in the cleaning liquid absorbs light of a specific wavelength according to the type of the oil. The concentration of the oil in the cleaning liquid is calculated by the optical absorption method while light intensity of light transmitted through the optical fiber is measured in a light receiving device connected to an output end of the optical fiber.

Here, transmittance T of light of the specific wavelength emitted from the other end of the optical fiber of the optical sensor having the present configuration is represented by the following expression (Expression 1).

[Math 1]

$$T = \exp(-C\alpha L\Gamma) \quad \text{(Expression 1)}$$

Here, C represents a concentration of oil in a cleaning liquid (mol/l), α represents an absorption coefficient of oil (l/mol/cm), and L represents an optical path length (cm) that is a length of an optical path where light absorption occurs (see FIG. 1). In addition, Γ represents a ratio of the intensity of light distributed in the cleaning liquid to the total intensity of light propagating through the optical fiber in the optical path where light absorption occurs.

Figure 3:
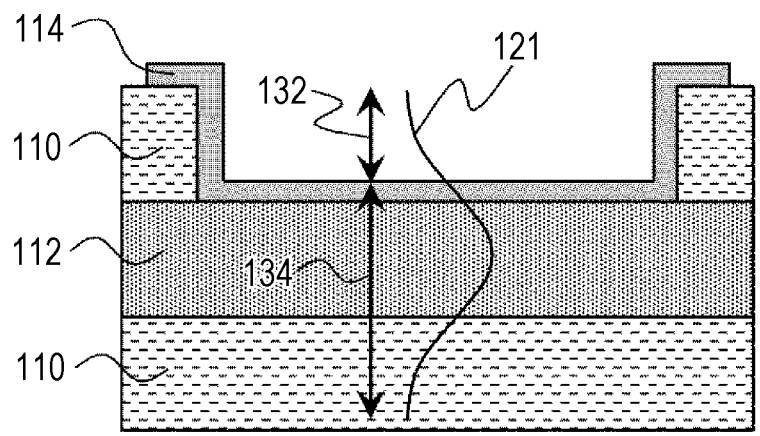
FIG. 3 is a diagram for describing a calculation method of Γ in the first embodiment of the present invention.

A calculation method of Γ is described with reference to FIG. 3. The range of intensity distribution 121 of the light propagating through the optical fiber includes areas 132 and 134. The area 132 is an area from which the cladding layer has been removed. In the area 132, absorption of light into the oil in the cleaning liquid occurs. In the area 134, light absorption does not occur. When P1 stands for the sum of light intensity in the area 132 in which light absorption occurs, and P2 stands for the sum of light intensity in the area 134 in which light absorption does not occur, Γ is represented by the following expression (Expression 2). That is, Γ is a ratio of light that leaks into the cleaning liquid while propagating through the optical fiber.

$$\Gamma = P1/(P1+P2) \quad \text{(Expression 2)}$$

In the configuration of the optical sensor according to the present embodiment, L corresponds to the length of the part of the optical fiber from which the cladding layer has been removed, and Γ is determined by the structure of the optical fiber. In addition, α is determined by the type of oil. As described above, since L, Γ and α are known in the present configuration, it is possible to find the concentration C of oil by measuring the transmittance T of the light of the specific wavelength absorbed by the oil. Here, the transmittance T has a value of 1.0 when there is no oil, that is, when the concentration C of oil has a value of 0, and decreases as the concentration C increases. The degree of the decrease increases as the optical path length L and Γ increase. Accordingly, as the optical path length L and Γ increase, sensor accuracy increases. It is thus possible to detect a lower concentration of oil.

Figure 4:
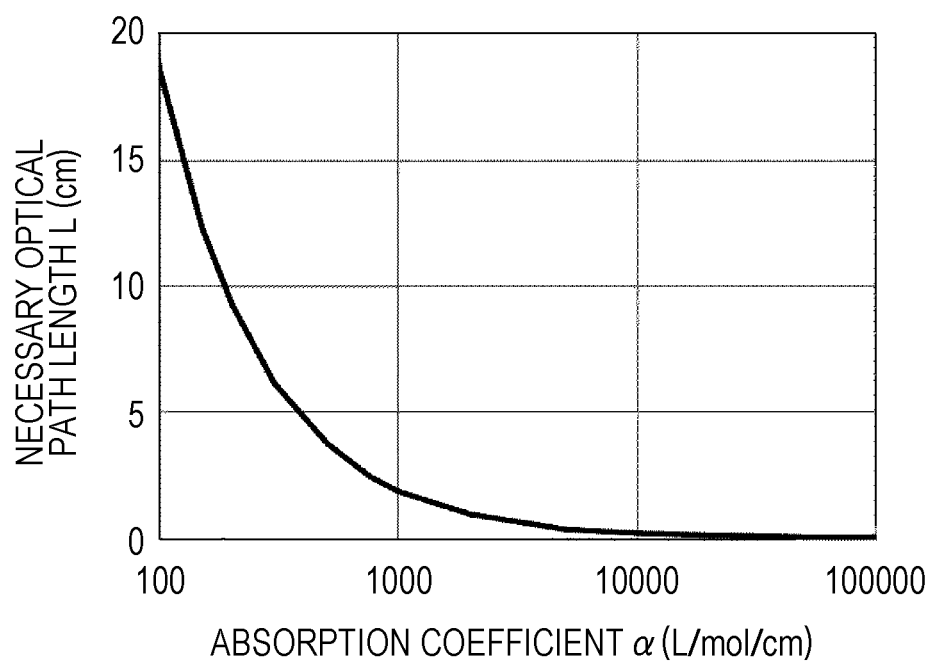
FIG. 4 is a diagram showing a result of calculation of an optical path length L necessary for detecting a low concentration of oil in a cleaning liquid in the first embodiment of the present invention.

FIG. 4 shows a result of calculation of the optical path length L necessary for detecting a low concentration of oil in the cleaning liquid. On the assumption that Γ is 0.15, calculation has been performed to find the optical path length L such that the transmittance T is 0.5. It is clear from FIG. 4 that it is possible to detect oil which absorbs light in the infrared region having an absorption coefficient of approximately several hundred (l/mol/cm) by setting the optical path length L to approximately 5 to 10 cm.

As described above, use of the analyzer using the optical sensor according to the present embodiment enables measurement of the concentration of oil existing at a low concentration in a cleaning liquid that is an organic solvent or a basic or acidic solution, over a long period of time.

FIGS. 5A to 5F show a method of manufacturing the optical sensor according to the present embodiment. First, as shown in FIG. 5A, a Si substrate 116 is etched to form a V-groove, and an optical fiber formed of the cladding layer 110 and the core layer 112 is placed in the V-groove. Here, the V-groove is formed with an appropriate width and depth for the optical fiber placed therein such that approximately half of the optical fiber in its radial direction fits in the V-groove. Therefore, the V-groove is formed by etching at different etching rates depending on a plane orientation of Si. Such etching enables the V-groove to have a width and a depth of desired values. Furthermore, the length of an optical fiber to be placed on the V-groove is made equal to the optical path length L of the optical sensor to be manufactured.

Next, as shown in FIG. 5B, the cladding layer 110 of the optical fiber placed on the V-groove is partially removed by etching using resist 118.

Then, as shown in FIG. 5C, the protective layer 114 made of SiN, polymethylmethacrylate (PMMA), or the like is formed on the part of the optical fiber from which the cladding layer 110 has been removed.

Subsequently, as shown in FIG. 5D, a layer of resist 120 is formed such that the protective layer 114 remains only in the vicinity of the core layer 112.

Next, as shown in FIG. 5E, the protective layer 114 is etched by use of the resist 120. Then, finally, the resist 120 is removed to complete the optical sensor according to the present embodiment, as shown in FIG. 5F.

Figure 6:
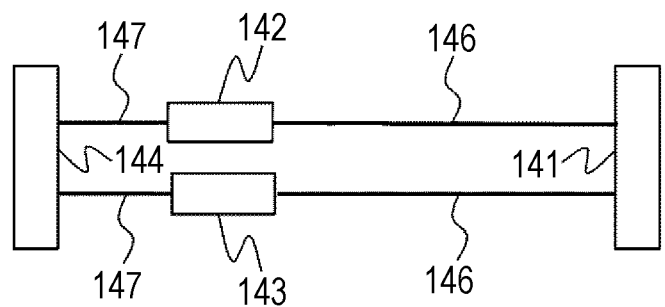
FIG. 6 is a diagram showing a configuration example of an analyzer using the optical sensor according to the first embodiment of the present invention.

FIG. 6 shows a configuration example of the analyzer using the optical sensor according to the present embodiment. The analyzer according to the present embodiment includes an optical sensor 141 according to the present embodiment, a light source device 142, a light receiving device 143, and a control device 144. The optical sensor 141 is connected to the light source device 142 and the light receiving device 143 via, for example, optical fibers 146. Light from the light source device 142 enters the optical sensor 141, and then is emitted from the optical sensor 141 to the light receiving device 143. Operation of the light source device 142 and the light receiving device 143 is controlled by the control device 144. The light source device 142 and the light receiving device 143 are connected to the control device 144 through, for example, electric wires 147.

Figure 7:
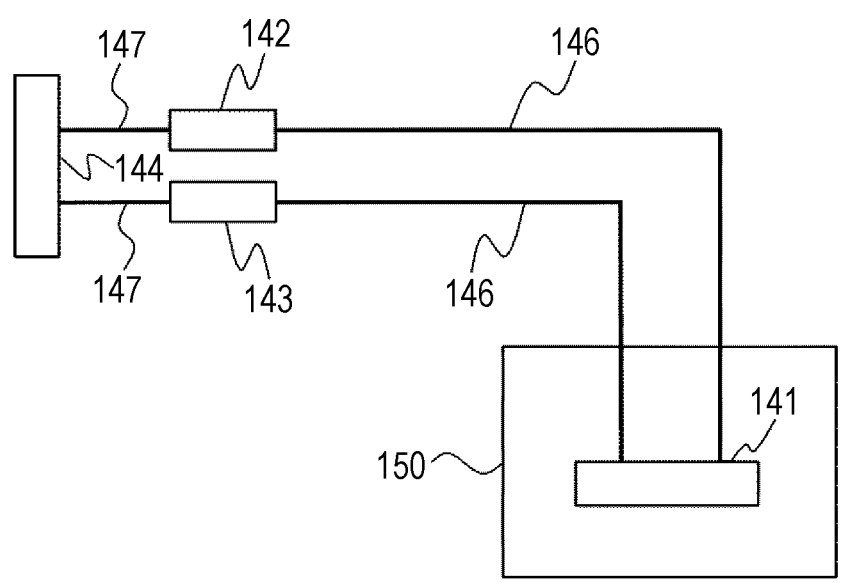
FIG. 7 is a diagram showing an example of a method of measuring the concentration of oil in a cleaning liquid in a cleaning tank by use of the analyzer according to the first embodiment of the present invention.

FIG. 7 shows an example of a method of measuring the concentration of oil in a cleaning liquid in a cleaning tank 150 by using the analyzer according to the present embodiment. In order to measure the concentration of oil in the cleaning liquid in the cleaning tank 150, the optical sensor 141 just needs to be inserted into the cleaning tank 150 filled with the cleaning liquid.

Second Embodiment

Figure 8:
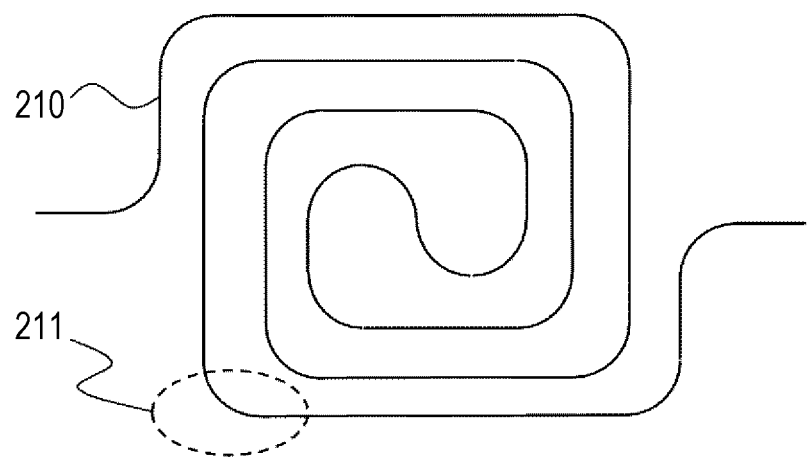
FIG. 8 is a diagram showing a configuration example of an optical sensor using an optical waveguide formed on a Si substrate or the like according to a second embodiment of the present invention.

FIG. 8 shows a second embodiment of an optical sensor. In the present embodiment, there is used an optical waveguide formed on a Si substrate, a silicon on insulator (SOI) substrate, a glass substrate, or the like. In the present embodiment, a core layer of Si, SiN, glass, or the like is formed on a substrate to form an optical waveguide. Then, a cladding layer on a side opposite to the substrate with respect to the core layer is removed or thinned so as to measure the concentration of oil in a cleaning liquid by causing light having leaked from the core layer on the side opposite to the substrate to be absorbed by the oil. Here, the length of the core layer of the optical waveguide in the area where the cladding layer has been removed or thinned corresponds to the optical path length L in Expression 1 described above.

In the present configuration, use of Si or SiN as a material of the core layer achieves resistance to an organic solvent, acid, or base, so that it is not always necessary to provide a protective material. Of course, a protective material against an organic solvent, acid, or base may be provided.

FIG. 8 is a top view of the optical waveguide. Here, a cladding layer on the side opposite to the substrate has been removed or thinned over an entire area where a core layer 210 has been formed. That is, the total length of the core layer of the optical waveguide shown in FIG. 8 corresponds to the optical path length L in Expression 1 described above. In the present embodiment, the core layer 210 is formed in a spiral shape so as to increase the optical path length L and reduce the transmittance T to increase the sensitivity of the sensor. Furthermore, the present invention improves the sensitivity of the sensor by reducing the width of the core layer of the optical waveguide to increase the above-described $\Gamma$ and reduce the transmittance T. Generally, in an optical waveguide, a reduction in the width of a core layer increases $\Gamma$, but reduces resistance to bending. That is, when a waveguide with a core layer having a small width is bent, loss in light increases.

Figure 9:
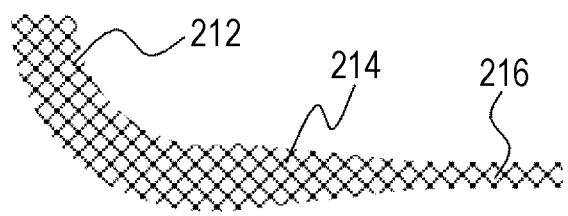
FIG. 9 is a diagram describing an example in which the width of a core layer of the optical waveguide according to the second embodiment of the present invention is increased in a curved portion and reduced in a linear portion.

Therefore, the present embodiment adopts a configuration shown in FIG. 9. FIG. 9 is an enlarged view of a part 211 surrounded by a broken line in FIG. 8. As shown in FIG. 9, in the present embodiment, a curved portion 212 of the core layer is increased in width, and a linear portion 216 of the core layer is reduced in width. In addition, both portions are connected by a core layer 214 in a tapered shape. This prevents loss in light at the curved portion, and achieves large $\Gamma$ at the linear portion. Therefore, with the present configuration, it is possible to implement an optical sensor capable of detecting a low concentration of oil with high sensitivity without impairing propagation characteristics.

Figure 10:
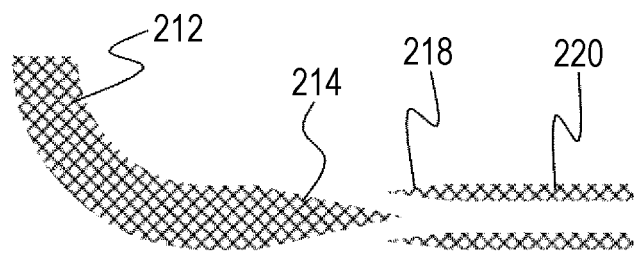
FIG. 10 is a diagram describing an example in which the linear portion of the optical waveguide according to the second embodiment of the present invention is formed as a slot waveguide.

FIG. 10 shows a case in which the linear portion is formed as a slot waveguide in the present embodiment. The slot waveguide includes two narrow core layers arranged in parallel in a direction of light propagation, and can achieve large F. However, the slot waveguide also has poor resistance to bending. Therefore, in the present embodiment, the curved portion 212 of the core layer is increased in width, and the linear portion of the core layer is formed as a slot waveguide 220, as shown in FIG. 10. In addition, both portions are connected by the core layer 214 and core layers 218 in a tapered shape. This prevents loss in light at the curved portion, and achieves large $\Gamma$ at the linear portion. Therefore, with the present configuration, it is possible to implement an optical sensor capable of detecting a low concentration of oil with high sensitivity without impairing propagation characteristics.

Figure 11A:
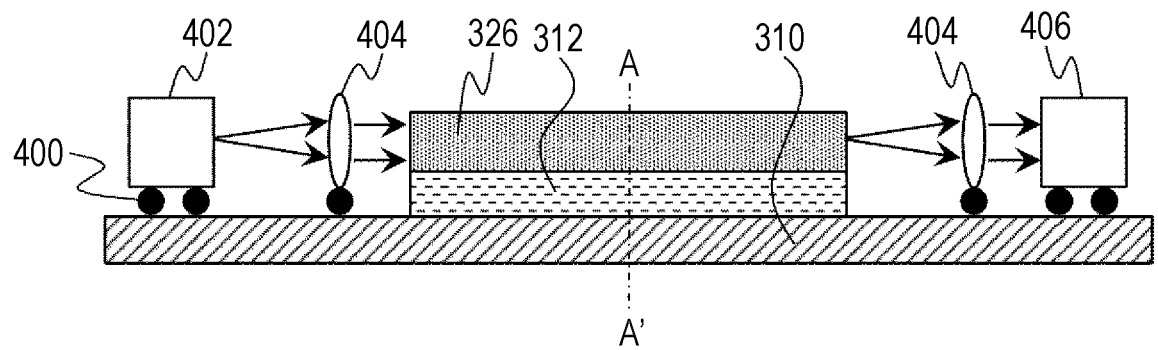
FIG. 11A is a diagram showing an example of mounting a light source and a light receiver on an optical sensor that includes the optical waveguide according to the second embodiment.

FIG. 11A shows an example of mounting a light source and a light receiver on an optical sensor that includes the optical waveguide according to the present embodiment. FIG. 11A is a cross-sectional view based on the assumption that light propagates in the horizontal direction of the drawing. In the present embodiment, the optical waveguide includes an SOI core layer 326 formed on a SiO$_2$ layer 312 that is formed on a Si substrate 310. Furthermore, the SOI core layer 326 is formed in a linear shape. In the present optical sensor, the SiO$_2$ layer 312 and the SOI core layer 326 are formed on a part of the Si substrate 310. In order to mount a light source and a light receiver on the present sensor, the light source and the light receiver just need to be installed on another part of the Si substrate 310 on which neither the SiO$_2$ layer 312 nor the SOI core layer 326 is formed. In FIG. 11A, a light source 402 and a light receiver 406 are installed on the Si substrate 310 via silicon bumps 400. Moreover, a lens 404 may be provided, via the silicon bump 400, between the light source 402 and the optical waveguide and also between the optical waveguide and the light receiver 406. With the present configuration, the light source 402 and the light receiver 406 can be mounted on the optical sensor that includes the optical waveguide, so that light from the light source 402 can enter the optical waveguide, and light from the optical waveguide can enter the light receiver 406.

Figure 11B:
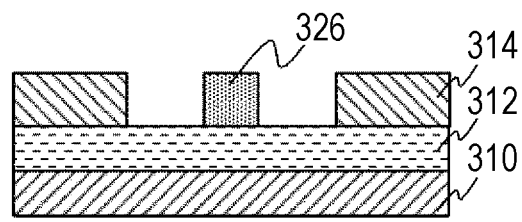
FIG. 11B is a cross-sectional view taken along the line A-A' shown in FIG. 11A.
Figure 12:
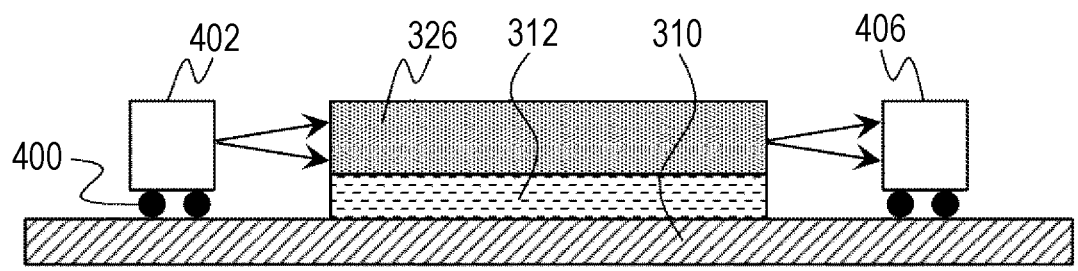
FIG. 12 is a diagram showing a mounting example shown in FIG. 11A from which lenses have been removed.

FIG. 11B is a cross-sectional view taken along the line A-A' shown in FIG. 11A. The SOI core layer 326 is limited in width in the horizontal direction to form the optical waveguide. In the case where the light source 402 and the light receiver 406 are mounted on the optical sensor that includes the optical waveguide, it is not always necessary to use the lens 404. FIG. 12 shows a mounting example in which the lens 404 is not used.

FIGS. 13A to 13D show a manufacturing method in the case where the light source 402 and the light receiver 406 are mounted on the optical sensor that includes the optical waveguide shown in FIGS. 11A and 11B.

Figure 13A:
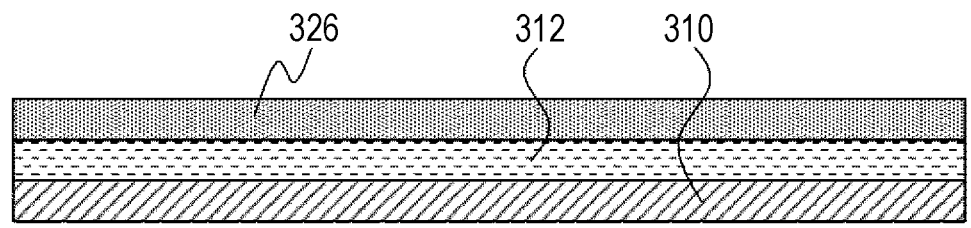
FIGS. 13A to 13D are diagrams showing a manufacturing method in the case where a light source and a light receiver are mounted on the optical sensor that includes the optical waveguide shown in FIGS. 11A and 11B.

First, the SiO$_2$ layer 312 and the SOI core layer 326 are formed on the Si substrate 310 (FIG. 13A).

Figure 13B:
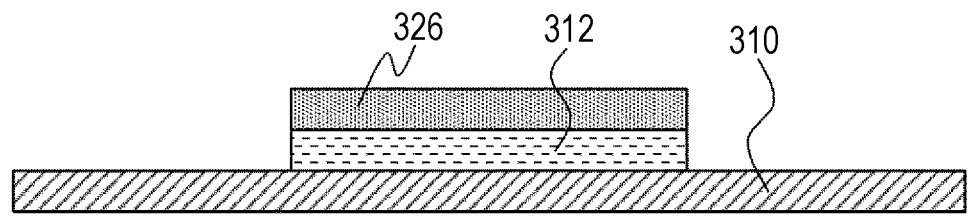

Next, the SiO$_2$ layer 312 and the SOI core layer 326 are patterned by etching to form the optical waveguide as shown in FIGS. 11A and 11B (FIG. 13B).

Figure 13C:
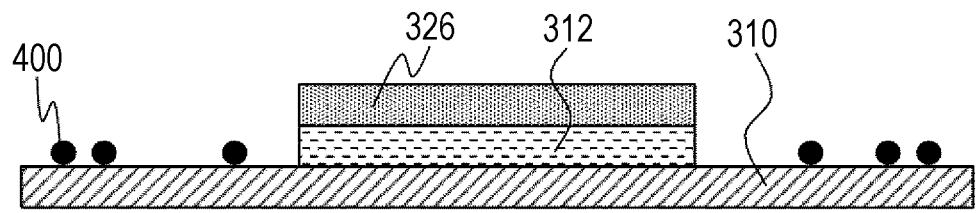
Figure 13D:
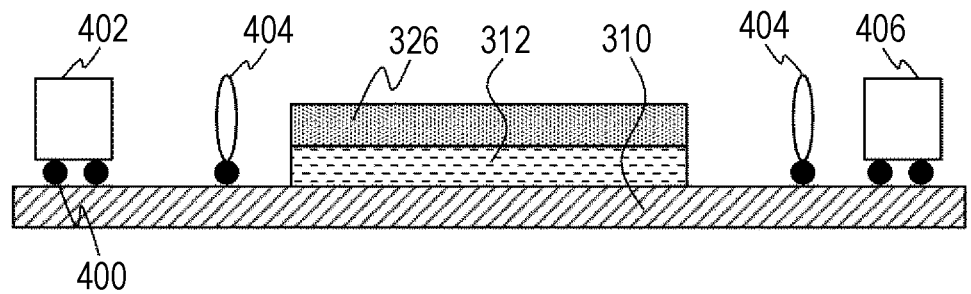

Next, the silicon bumps 400 are formed on the Si substrate 310 (FIG. 13C).

Finally, the light source 402 and the light receiver 406 can be mounted on the optical sensor that includes the optical waveguide, by installation of the light source 402, the light receiver 406, and the lenses 404 on the silicon bumps 400.

Third Embodiment

A third embodiment of an optical waveguide is shown in FIGS. 14A to 14G. In the present embodiment, there is provided an example of integrating a light source into an optical waveguide.

Figure 14A:
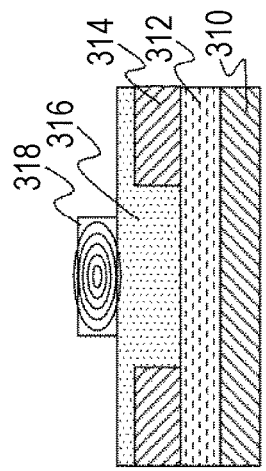
FIGS. 14A to 14G are diagrams showing a configuration example of integrating a semiconductor laser into an optical waveguide according to a third embodiment of the present invention.
Figure 14B:
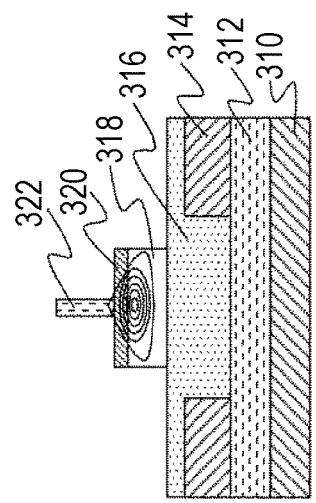
Figure 14C:
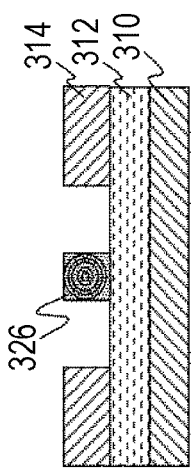
Figure 14G:
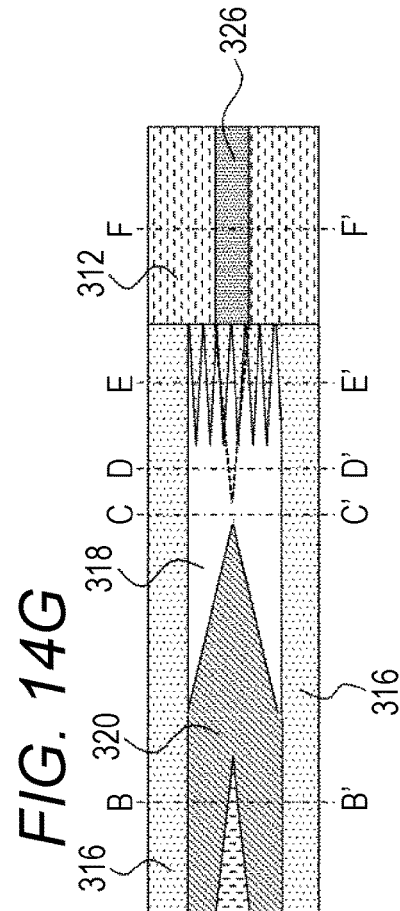
Figure 14D:
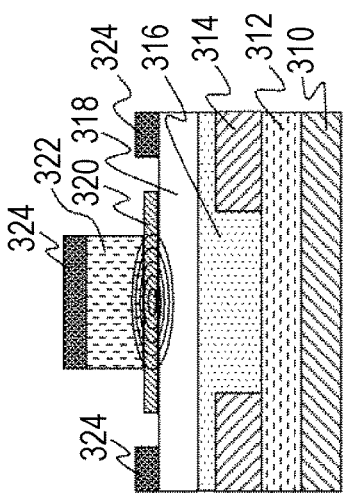
Figure 14E:
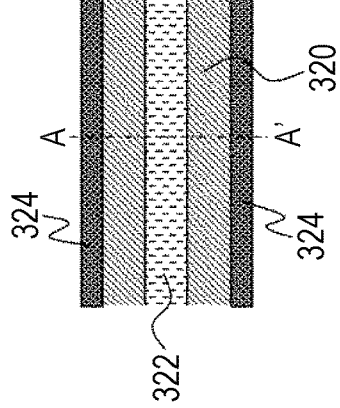
Figure 14F:
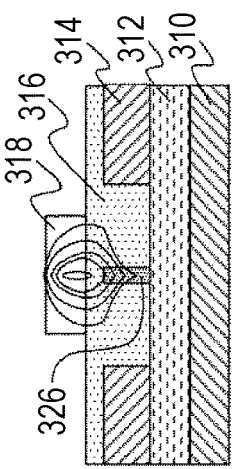

FIGS. 14A to 14G show a configuration in which a semiconductor laser formed of a compound semiconductor is integrated into an optical waveguide having Si (SOI) as a core formed on an SOI substrate. FIG. 14G, positioned at the center of the drawing, shows a top view. Vertical cross-sectional views taken along respective alternate long and short dashed lines shown in the top view are shown in upper and lower parts of the drawing. It should be noted that an electrode 324 formed on an InP layer 322 serving as an upper cladding layer is not shown in the top view of FIG. 14G.

The present configuration includes a gain region, a mode conversion region, and an optical waveguide region of a Si core layer in order from the left of the top view of FIG. 14G. The semiconductor laser serving as a light source is formed in the gain region. Light from the semiconductor laser enters the optical waveguide region via the mode conversion region. The gain region of the semiconductor laser corresponds to a region including the section line A-A' on the left of the top view of FIG. 14G. In the gain region, electrodes 324 are formed on both sides of an element on an InP layer 318 serving as a lower cladding layer.

The structure of the gain region will be described with reference to an A-A' cross-sectional view of FIG. 14A. In the gain region, the semiconductor laser formed of the compound semiconductor is joined to an upper side of the SOI substrate via an adhesive layer 316 made of spin-on glass (SOG), benzocyclobutene (BCB), or the like. The SOI substrate is formed of a Si substrate 310, a SiO$_2$ layer 312 also referred to as a buried oxide (BOX) layer, and a Si layer 314 also referred to as an SOI layer. The semiconductor laser includes the InP layer 318 serving as the lower cladding layer, an MQW/SCH layer 320 serving as an active layer, and the InP layer 322 serving as the upper cladding layer. The electrodes 324 are formed on the InP layer 318 serving as the lower cladding layer and the InP layer 322 serving as the upper cladding layer. In the gain region, a large part of propagating light is localized in the MQW/SCH layer 320. In order to form a semiconductor laser by using the present gain region, for example, a grating just needs to be formed in the lower cladding layer, or a reflecting mirror just needs to be formed in the optical waveguide region to be integrated.

Next, the configuration of the mode conversion region will be described. The electrode 324 is not formed in the mode conversion region. Furthermore, the width of the InP layer 322 is reduced in a manner to form a tapered shape so that the propagating light localized in the MQW/SCH layer 320 in the gain region leaks into the InP layer 318. A layer structure and light distribution in this case are shown in a B-B' cross-sectional view of FIG. 14B. In the mode conversion region, the width of the MQW/SCH layer 320 is also reduced in a manner to form a tapered shape so that a large part of the propagating light is localized in the InP layer 318. A layer structure and light distribution in this case are shown in a C-C' cross-sectional view of FIG. 14C.

Next, an SOI core layer 326 serving as a core layer in the optical waveguide region is formed such that its core width increases in a manner to form an inverse tapered shape. As a result, the propagating light localized in the InP layer 318 becomes distributed in the SOI core layer 326 having a high refractive index. A layer structure and light distribution in this case are shown in a D-D' cross-sectional view of FIG. 14D. Moreover, the width of the InP layer 318 is reduced in a manner to form multiple tapered portions. As a result, the distribution of the propagating light into the SOI core layer 326 increases. Here, in the case where the width of the InP layer 318 is reduced in a manner to form a single tapered portion, it is difficult to efficiently cause the propagating light to enter the SOI core layer 326 when there is misalignment of the axis of the tapered portion and the axis of the SOI core layer 326. Meanwhile, in the case of forming multiple tapered portions, the propagating light can enter the SOI core layer 326 without loss even when there is misalignment of the axes. A layer structure and light distribution in this case are shown in an E-E' cross-sectional view of FIG. 14E.

Finally, when the InP layer 318 is completely eliminated, it is possible to cause the distribution shape of the propagating light to coincide with the eigenmode shape of the optical waveguide. A layer structure and light distribution in this case are shown in an F-F' cross-sectional view of FIG. 14F. As described above, the present configuration enables the light source to be integrated into the optical waveguide.

Additionally, in the present configuration, the semiconductor laser formed of the compound semiconductor may be directly formed on the SOI substrate without use of an adhesive. FIGS. 15A to 15G show a configuration in that case.

Figure 16A:
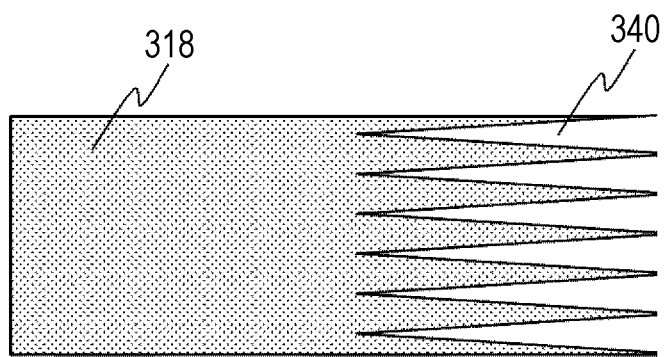
FIGS. 16A and 16B are diagrams showing shapes of an InP layer serving as a lower cladding layer in a plane perpendicular to a stacking direction of a semiconductor in a mode conversion region between the semiconductor laser and the optical waveguide shown in FIGS. 14A to 14G and FIGS. 15A to 15G.
Figure 16B:
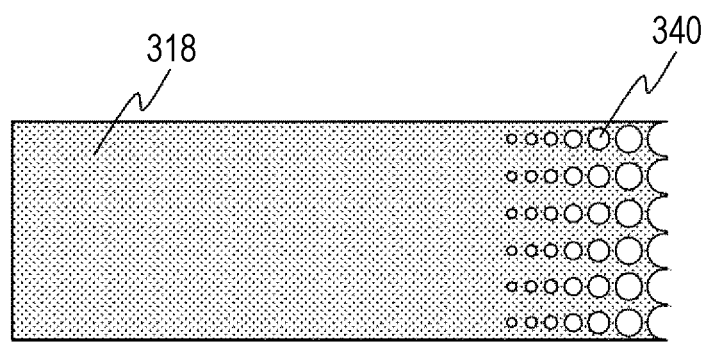

FIGS. 16A and 16B show top views of the above-described InP layer 318. That is, FIGS. 16A and 16B show shapes of the above-described InP layer 318 in a plane perpendicular to a stacking direction of the semiconductor. The InP layer 318 is patterned by etching. In the present example, an etched area of the InP layer 318 is occupied by air 340. However, the area may be occupied by another material. The InP layer 318 may be shaped in a manner to form multiple tapered portions as shown in FIG. 16A. Alternatively, the shape of the InP layer 318 may be formed such that equivalent refractive index distribution is multi-modal, as shown in FIG. 16B.

In addition, the light source integrated into the optical waveguide of the present invention can be used not only for sensors but also as, for example, a light source for optical communication, a light source for optical interconnection between LSIs, a light source for other optical integrated circuits, and a light source for silicon photonics in general.

What is claimed is:

1. An analyzer comprising:
   an optical sensor section in which a cladding layer of an optical fiber is removed by a predetermined optical path length so as to expose a core layer, a protective material is disposed directly on a surface of the exposed core layer, the protective material having higher resistance to an organic solvent, base, or acid than that of the cladding layer, and the protective material is polymethylmethacrylate (PMMA), which is different than a material of the core layer;
   a light source device that causes light to enter one end of the optical fiber of the optical sensor;
   a light receiving device that receives transmitted light emitted from another end of the optical fiber of the optical sensor; and
   a control device that controls the light source device and the light receiving device to measure optical transmittance in the optical sensor based on a ratio of intensity of the light emitted from the light source device to intensity of the light received by the light receiving device.

2. The analyzer according to claim 1, wherein the predetermined optical path length by which the cladding layer of the optical fiber is removed so as to expose the core layer is between 5 and 10 cm.

3. An optical sensor and an analyzer, comprising:
   an optical waveguide in which an insulating layer and a core layer formed on a substrate are patterned by etching to form the core layer in a spiral shape;
   a light emitting element that causes light to enter one end of the optical waveguide; and
   a light receiving element that receives transmitted light emitted from another end of the optical waveguide,
   wherein a cladding layer on a side opposite to the substrate with respect to the core layer is removed or thinned,
   wherein optical transmittance in the optical waveguide is measured based on a ratio of intensity of the light emitted from the light emitting element to intensity of the light received by the light receiving element,
   wherein a semiconductor laser is integrated into the optical waveguide as the light emitting element, the semiconductor laser being formed of a compound semiconductor attached to an upper surface of the optical waveguide substrate, the semiconductor laser being of a ridge type,
   wherein the semiconductor laser includes a first InP layer and a second InP layer disposed above the first InP layer,
   wherein the semiconductor laser includes electrodes disposed on the first InP layer,
   wherein the second InP layer is disposed between the electrodes in a plan view, wherein distribution of propagating light is moved from the semiconductor laser to the optical waveguide by a reduction in an effective refractive index of layers of the compound semiconductor forming the semiconductor laser in a direction of light propagation, wherein a width of the second InP layer decreases in the direction of light propagation, and wherein a width of the first InP layer of the layers of the compound semiconductor forming the semiconductor laser is shaped in a manner to form multiple tapered portions.

4. The optical sensor and the analyzer according to claim 3, wherein in an area in which the cladding layer on the side opposite to the substrate with respect to the core layer is removed or thinned, the core layer of the optical waveguide is made of a material having higher resistance to an organic solvent, base, or acid than that of the cladding layer.

5. The optical sensor and the analyzer according to claim 3, wherein a linear portion of the core layer of the optical waveguide is smaller in width than a curved portion thereof.

6. The optical sensor and the analyzer according to claim 3, wherein at least a part of the linear portion of the optical waveguide is of a slot waveguide type.

7. The optical sensor and the analyzer according to claim 3, wherein the at least one of the layers of the compound semiconductor forming the semiconductor laser is a cladding layer of the semiconductor laser on a side facing the optical waveguide substrate, the at least one of the layers being shaped in a manner to form the plurality of tapered portions with the pointed ends in the direction of light propagation, in the plane perpendicular to the stacking direction of the semiconductor layers.

* * * * *